United States Patent [19]

Simon

[11] 4,432,520
[45] Feb. 21, 1984

[54] STRAIN RELIEF ASSEMBLY

[76] Inventor: Hans Simon, Bruchhausener Strasse, D-5463 Unkel, Fed. Rep. of Germany

[21] Appl. No.: 344,326

[22] Filed: Feb. 1, 1982

[30] Foreign Application Priority Data

Feb. 13, 1981 [DE] Fed. Rep. of Germany ....... 3105316
Apr. 29, 1981 [DE] Fed. Rep. of Germany ....... 3117029

[51] Int. Cl.³ .............................................. F16L 5/00
[52] U.S. Cl. ................................. 248/56; 174/153 G
[58] Field of Search ............. 248/56, 27.1; 174/65 G, 174/153 G; 285/178; 403/194, 196, 197

[56] References Cited

U.S. PATENT DOCUMENTS 3,285,551 11/1966 Tschanz ................................ 248/56
3,749,818 7/1973 Jemison ......................... 174/153 G
4,169,572 10/1979 Simon ................................... 248/56
4,354,651 10/1982 Simon ................................... 248/56

Primary Examiner—William H. Schultz
Assistant Examiner—Ramon O. Ramirez
Attorney, Agent, or Firm—Neuman, Williams, Anderson & Olson

[57] ABSTRACT

A cable strain relief for mounting in a supporting wall aperture or the like is provided comprising a grommet and a rotatable clamping means received in said grommet. The grommet and clamping means have aligned cable-receiving passageways. The clamping means includes a flexible clamping band detachably anchored at a distal end to the grommet, and a movable, opposed proximal end integral with said clamping means which is rotatable by said clamping means about the periphery of a cable passing through said grommet and clamping means. In a modified construction two clamping bands each of which has axially offset, opposed portions are provided which simultaneously engage the cable periphery when actuated by the clamping means.

9 Claims, 15 Drawing Figures

STRAIN RELIEF ASSEMBLY

This invention relates to a cable-lead-through adapted to effect a strain relief function.

It is the purpose of a cable-lead-through of this type to protect cables from the lead-through opening while simultaneously protecting the cables from strain in tension and torsion, and has particular applicability in relieving electric power lines accordingly. Additional objects are an ability to clamp a wide range of cable sizes, ease of handling and low production costs.

In prior art cable-lead-throughs, both the clamping member and the cable-engaging clamping element are rotatable in an inner noncircular lead-through grommet. In the open position the clamping element has an enlarged inner diameter, so that the cable can be readily led therethrough. The clamping member is then rotated in the noncircular lead-through opening of the grommet, causing it to be deformed in a radially inward direction to a smaller inner diameter, thereby firmly clamping the cable. The grommet itself is inserted into a housing opening and its edges are firmly secured in the housing opening.

In prior art cable-lead-throughs of this kind there is a danger that the cables will be kinked, clamped or pinched in a pincer-like manner in the axial or transverse direction of the cable. Furthermore, the clamping range of the prior art cable-lead-throughs is small, i.e., the cable-lead-through is designed for a small range of cable diameters. When the inserted cables are large they are easily nicked, whereas cables which are of smaller diameter cannot be clamped in a sufficiently firm manner, and, therefore, cannot be provided with any strain relief.

To overcome these disadvantages, it is an object of this invention to design a cable-lead-through of the above-mentioned type providing highly effective traction or strain relief, that clampingly engages a large cable surface area and possesses an extensive clamping range.

It is a further object of the invention that the cable passageway should be easy to manufacture and mold, particularly if it is produced from plastics by an injection molding process.

The above and other objects of this invention will become apparent from the following description when read in the light of the drawing and appended claims.

In one embodiment of this invention a grommet adapted to be received in fixed position in a supporting aperture and a rotatable clamping member or element received in the grommet provide a strain relief assembly for a cable or the like. Both the grommet and clamping element are centrally apertured for passage of a cable. The grommet has an annular flange which is slotted for passage of a locking lug of the clamping element, which lug is rotatable beneath the flange. The clamping element has a flexible clamping band extending in a plane at substantially right angles to the axes of the apertures in the grommet and clamping device. The grommet has a slotted keyway for anchoring the distal end of the clamping band whereafter the opposed clamping band proximal end secured to the clamping element may be rotated with the clamping element so as to wrap about the periphery of a cable passing through the assembly, securely locking the cable between a band-engaging surface and an inner peripheral surface portion of the grommet. Pawl and ratchet means on relatively sliding surfaces of the clamping element and grommet maintain the locking band in secure engagement about the cable passing through the assembly and facilitate cable gripping by the band.

In a modified strain relief assembly a rotatable clamping element supports two clamping bands as will hereinafter be explained in greater detail.

For a more complete understanding of this invention reference will now be made to the drawing wherein:

FIG. 10 is a side elevational view of a clamping member employed in such a lead through;

FIG. 11 is a side elevational view taken in the direction of arrow XI in FIG. 10, i.e., rotated 90° from the position of FIG. 10;

FIG. 12 is a bottom view of the embodiment of FIG. 10 taken in the direction of arrow XII of FIG. 10;

FIG. 13 is a plan view of the associated lead-through grommet;

FIG. 14 is a side elevational view of a complete cable-lead-through assembly employing a grommet of the type of FIG. 13 in assembly with an engaged cable; and FIG. 15 is a bottom plan view of the assembly of FIG. 14 taken in the direction of arrow XV in FIG. 14.

Figure 5:
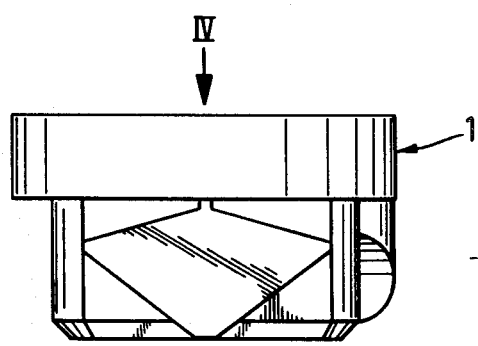
FIG. 5 is a side elevational view of the grommet of FIG. 4 and which may be employed in one embodiment of the provided invention.
Figure 8:
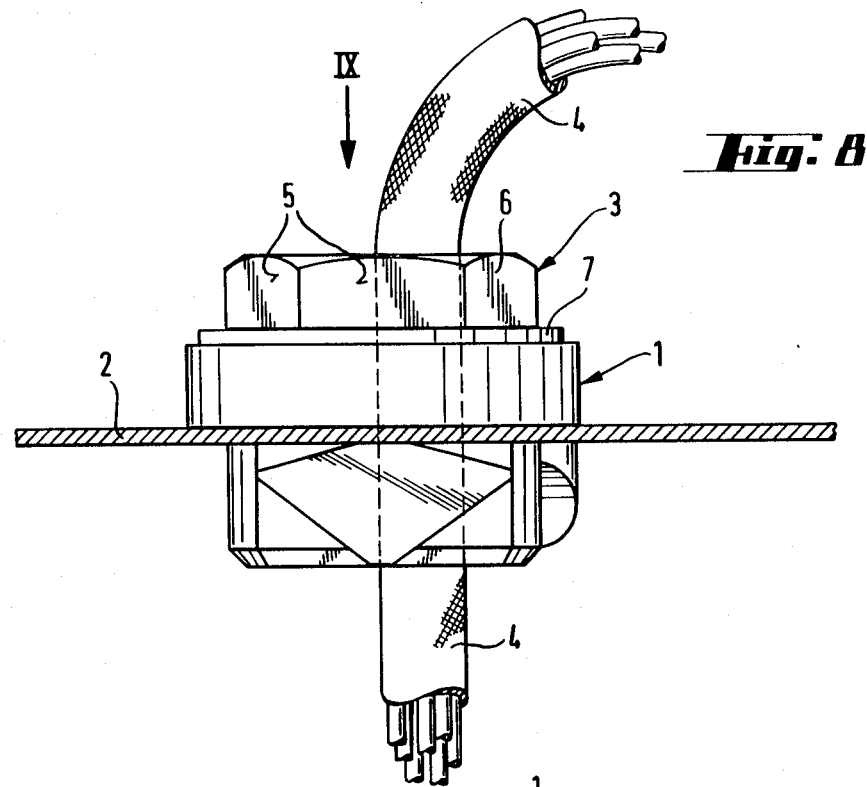
FIG. 8 is a side elevational view of a complete cable-lead-through assembly.

The cable grommet employed in the assembly of this invention comprises, as is customary, a lead-through grommet 1, see FIG. 5, which is inserted in a known manner in an opening of a supporting housing wall 2, as shown in FIG. 8, in which the grommet edges can be anchored.

Figure 1:
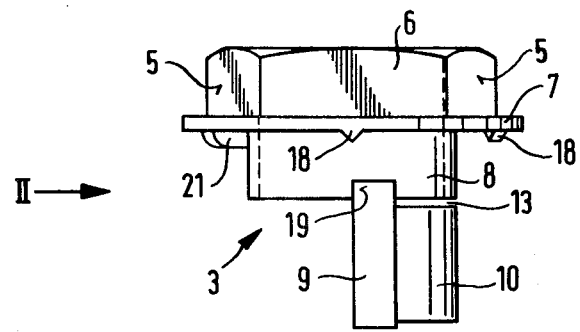
FIG. 1 is a side elevational view of one embodiment of a clamping member employed in a cable-lead-through of this invention.
Figure 2:
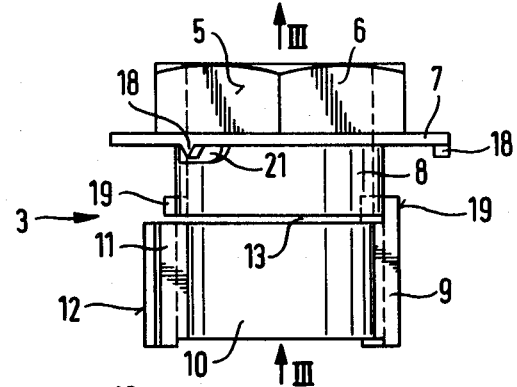
FIG. 2 illustrates the clamping member of FIG. 1 in a side elevational view that has been rotated 90° from the position shown in FIG. 1 taken in the direction of arrow II in FIG. 1.
Figure 3:
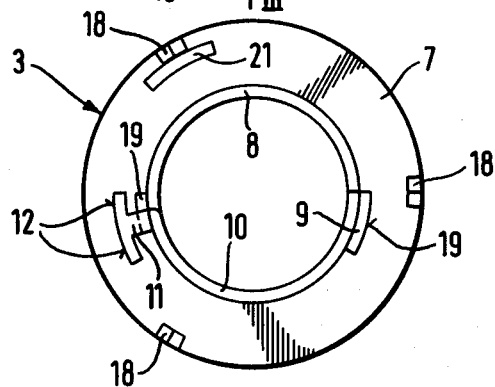
FIG. 3 is a bottom plan view of the clamping member of FIG. 2 taken in the direction of arrow III in FIG. 2.

A clamping member 3 of FIGS. 1–3 is insertable into the grommet 1 as illustrated in FIG. 8. While the clamping member 3 is in the open cable-receiving position, a cable 4 (FIGS. 8, 9) can be passed therethrough, but when the clamping member is rotated into the locked or clamping position it clasps the cable 4, thus fastening it relative to the grommet-clamping member assembly.

As is shown in FIGS. 1 to 3, clamping member 3 has a head 6, which is furnished with surfaces 5 for engaging a tool such as a spanner wrench or the like. Member 3 contacts the upper surface of grommet 1, as seen in FIG. 8, by means of flange 7.

Below and extending from the flange or collar 7 of member 3, there is provided an annular neck 8, see FIGS. 1–3, which is received in the central opening of the grommet 1 of FIG. 4. On one side of member 3 an axially extending web 9, FIGS. 1–2, is formed in one piece with the neck 8, and a clamping band 10 adjoins the said web and extends in a circumferential direction, i.e., transversely to the longitudinal axis. When viewed from below (FIG. 3), the clamping band 10 extends substantially along a semicircle and its diameter is identical with that of the neck 8 as evident from FIG. 3. An essentially T-shaped key 11, FIG. 3, having lateral fingers 12 is arranged at the free distal end of the clamping band 10, i.e., the end facing away from connecting web 9 to which the band proximal end is secured. Clamping band 10 is adapted to be moved at the end attached to the fastening web 9 so as to move into the circular opening circumscribed by the neck 8, and this band movement provides the clamping effect.

Figure 9:
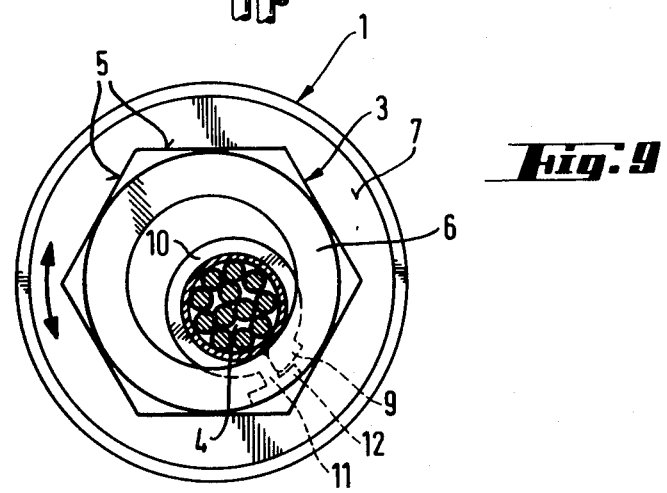
FIG. 9 is a top plan view of the cable-lead-through assembly of FIG. 8 taken in the direction of arrow IX of FIG. 8 and illustrating an engaged cable in section.

A peripheral wall portion of grommet 1 is provided with a keyway or recess 15 (FIG. 4) which corresponds in cross-section to that of key 11. Thus, when grommet 1 and clamping member 3 are assembled in the axial direction in the manner of FIG. 8, the key 11 is interfitted in the keyway 15, so that the distal free end of clamping band 10 is held in nonrotatable manner relative to grommet 1. However, head 6 of clamping member 3 is rotatable with reference to grommet 1 by means of a tool such as a spanner wrench engaging clamping member surfaces 5. In the course of head rotation, clamping band 10 leaves the position shown in FIG. 3, and now extends across the interior circular area defined by neck 8 into engagement with the inserted cable or hose which is thus firmly clamped between the clamping band 10 and an oppositely disposed clamping member wall portion as seen in FIG. 9. The numeral 13 in FIG. 2 identifies a gap between neck 8 and clamping band 10.

In order to retain the clamping member 3 in its cable-grasping or locking position relative to the grommet 1, as illustrated in FIG. 9, there is provided on the upper surface of the grommet 1 a ring of arresting teeth 17 (see FIG. 4) which engage three locking teeth 18 which are arranged in an angularly spaced manner at the edge of and also in a sufficiently resilient manner on the lower surface of the flange or collar 7 of clamping member 3 (FIGS. 2–3). The latter teeth engagement enables the clamping member 3 to rotate in a reverse manner for relaxing the clamping grip.

Figure 4:
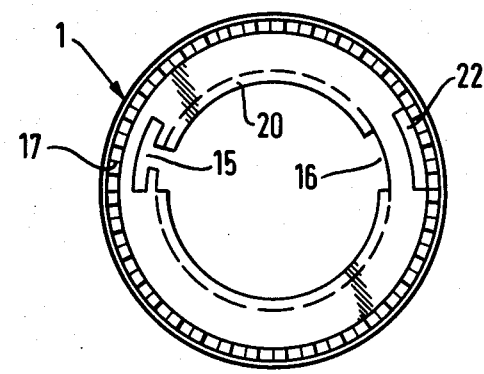
FIG. 4 is a top plan view of a grommet employed in one embodiment of a lead through of this invention, and illustrated in side elevation in FIG. 5, taken in a direction of arrow IV of FIG. 5.
Figure 6:
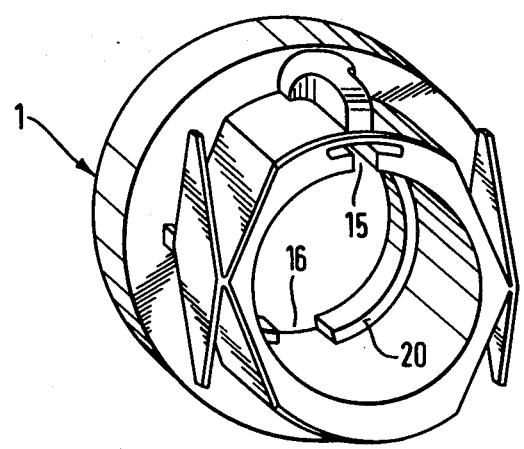
FIG. 6 is a perspective view of the lower lip of the grommet of FIGS. 4 and 5.
Figure 7:
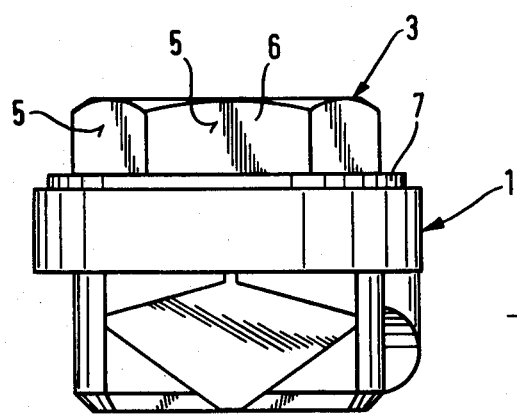
FIG. 7 is a side elevational view of the clamping member of FIG. 1 and grommet of FIGS. 5 and 6 in assembled relation.

To prevent the clamping member 3 from being inadvertently withdrawn too far or completely from engagement with grommet 1, the outer circumference of the neck 8 is fitted at angular intervals with several keys 19, FIG. 2, which, during axial grommet-clamping member assembly can be inserted through keyway 15 or a slot 16 of the grommet (see FIG. 4). During subsequent rotation of the clamping member keys 19 engage under a shoulder 20, which is arranged on the inside of the grommet 1 (see FIGS. 4 and 6).

Rotation of the clamping member 3 relative to grommet 1 is restricted to a desired measure by cooperating stop 21 (FIGS. 1–3) on the lower face of flange 7, and stop 22 (FIG. 4) on the grommet 1. The stop 22 is radially inwardly disposed relative to the clamping element locking teeth 18 of the grommet toothed ring 17 as illustrated in FIG. 4.

It is obvious that the clamping band 10 can define a smaller or larger arc, i.e., can be shorter or longer than is shown in FIG. 3.

In the illustrated embodiment of FIG. 1 the clamping member 3 can be rotated approximately 180°, whereupon the two ends of clamping band 10 meet, as illustrated in FIG. 9, as the fastening web 9 movable with clamping member 3 abuts against the web 12 of the key 11. In this position the cable with the smallest clampable diameter is nearly completely encircled by the clamping band 10. Cables of larger diameter are clamped between the clamping band 10 and an overlying axially spaced, inner surface portion of neck 8. The largest clampable cable diameter is the largest diameter which can be passed through the neck 8.

A second embodiment of a cable strain relief is more complex in structure and is, therefore, more costly to manufacture. Such embodiment is illustrated in FIGS. 10 to 15. In this embodiment two clamping bands are provided and arranged diametrically opposite to one another, one of them adjoining the other, when viewed in the direction of rotation. It is an advantage of this embodiment that an engaged cable is clamped centrally between the bands and not locked against a wall of the clamping element neck. Also, the clamping surfaces on either side are not axially displaced relative to one another.

The necessary rotation of the clamping member varies from between a few degrees for the largest engaged cable diameter to a maximum of 90° for the smallest clampable cable diameter. To prevent intersecting of the two clamping bands during rotation of the clamping member, i.e., one clamping band blocking the path of the other, the two clamping bands can be constructed in the form of a spiral, each following a helical path or a small part of a helical path. In the embodiment of FIGS. 10–15, the clamping member and the lead-through grommet are essentially identical with those of the embodiment shown in FIGS. 1 to 9; identical parts in FIGS. 10 to 15 are therefore allocated the same reference numerals as in FIGS. 1 to 9. The additional characteristics of this second embodiment are as follows.

In place of a single clamping band 10 of FIG. 1 this embodiment comprises two clamping bands 23, 24, (FIGS. 10–12), each of them extending approximately over half the defined circumference. Clamping band 23 adjoins clamping band 24 in the circumferential direction. Each of the two clamping bands 23, 24 is composed of two halves or sections 23a, 23b and 24a, 24b, respectively. The halves of each clamping band 23, 24 are displaced in the axial direction i.e., direction of insertion, by the band width plus "play" or interval 13a illustrated in FIG. 10. The two parts of each band are firmly joined together by a bridge or web 23c, 24c seen in FIG. 11.

Figure 10:
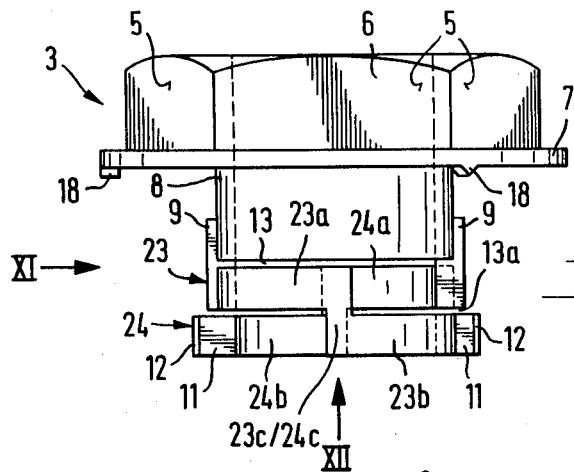
FIGS. 10 to 15 illustrate an embodiment of the cable-lead-through of this invention employing two clamping bands, namely.
Figure 11:
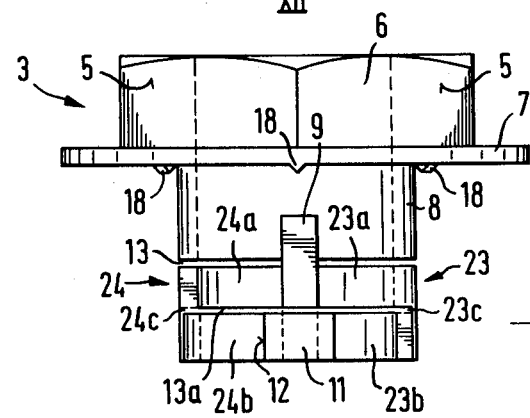
Figure 12:
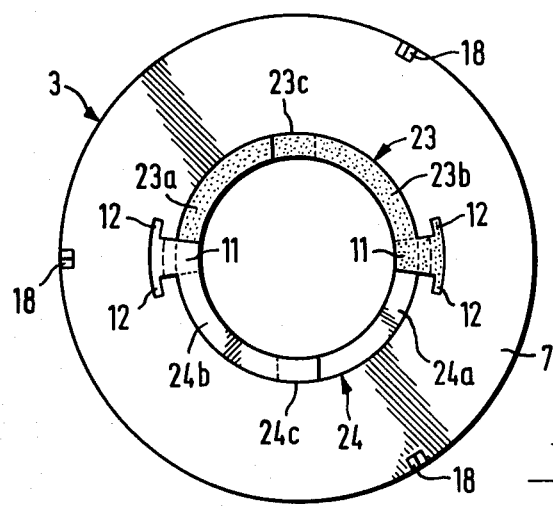
Figure 13:
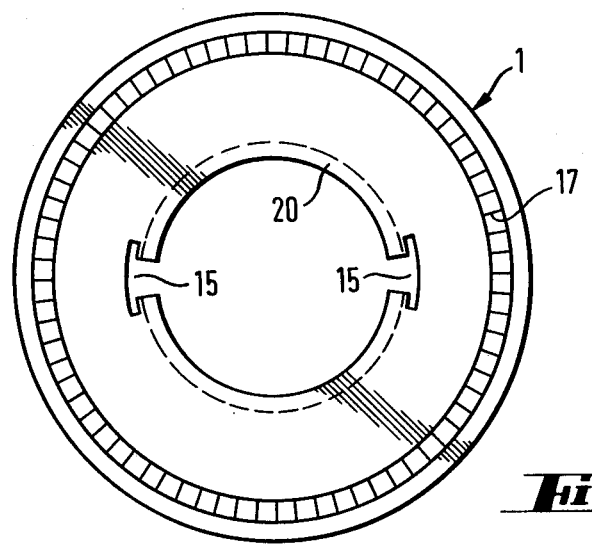
Figure 14:
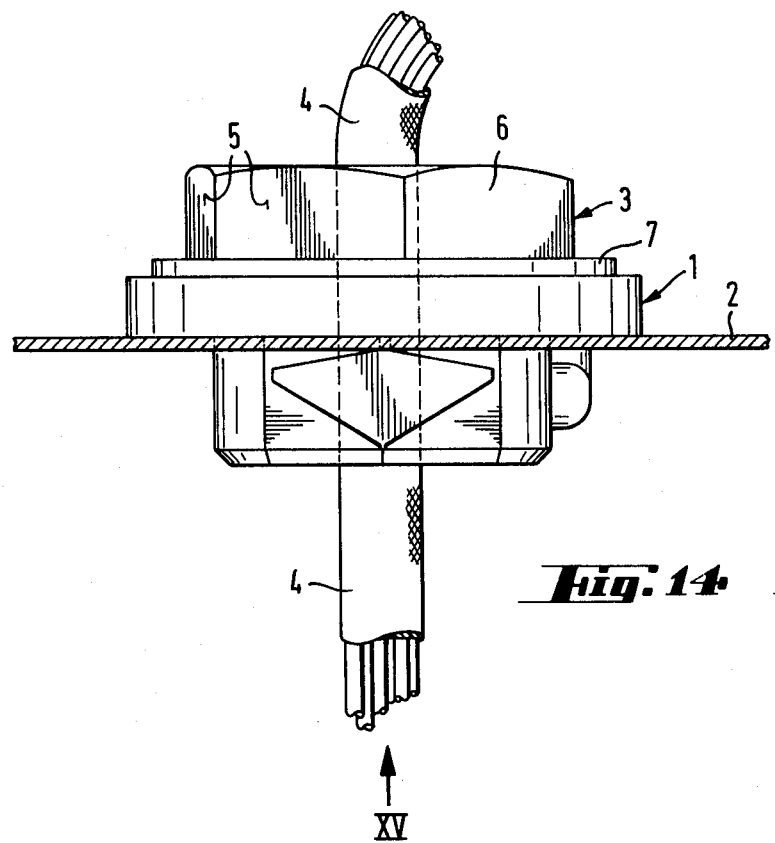
Figure 15:
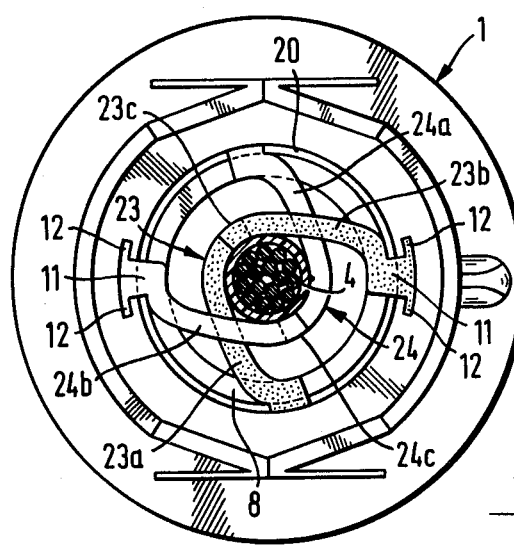

Each clamping band 23, 24 is connected with the neck 8 of the clamping member 3 of FIGS. 10–15 by an axial web 9, see FIG. 10. At the distal or free end of each clamping band 23, 24, more precisely, the free end of each of the axially displaced part 23b or 24b thereof, there is again provided an insertion section or key 11 with bilateral wings 12. During the axial insertion of the clamping member with the grommet, each of the two insertion sections is inserted into a corresponding insertion recess or keyway 15 of the grommet (FIG. 13), and held therein in a relatively nonrotatable manner. When the head 6 of the clamping member is rotated relative to the grommet 1, both clamping bands (previously only clamping band 10 in the embodiment of FIGS. 1–9), depart from the outer circumferential position (FIG. 12), cross the inner diameter of the grommet until the two clamping bands 23, 24 or respectively the four clamping band halves 23a, 23b, 24a, 24b (each at its center) engage between them an inserted cable 4 in firmly clamped position (see FIG. 15). Hence, cable 4 is evenly and securely held along practically its total circumference, and is clamped in coaxial position.

It is thus seen that the cable lead-through embodiments of this invention provide a number of desirable advantages. Such advantages include clamping a cable by encircling a large peripheral area, providing a practically infinitely variable range of cable diameters which may be clamped, and providing simple clamping and releasing action as in a rotatable screw, and hence simple handling and manufacture.

It is believed that the foregoing has made apparent a number of modifications of the above disclosed invention which remain within the ambit of the invention disclosed. This invention is to be limited, therefore, only by the scope of the appended claims.

What is claimed is:

1. A cable strain relief assembly comprising a grommet for reception in an aperture of a supporting wall or the like; clamping means receivable in said grommet; said clamping means and said grommet having corresponding cable-receiving passageways; said clamping means having a stationary anchor portion interlockingly engaging with said grommet in which received in interfitting engagement and a flexible band portion movable relative to said anchor portion for gripping engagement with a peripheral portion of a cable passing therethrough; said band portion extending from said clamping means anchor portion and being located in a plane at substantially right angles to the longitudinal axes of said cable-receiving passageways; said band portion having a movable end opposed to said anchor portion; and a clamping means rotatable drive portion connected to said band movable end for rotating said band movable end and moving said flexible band portion about the longitudinal axes of said passageways.

2. A cable strain relief assembly comprising a grommet for reception in an aperture of a supporting wall or the like; clamping means receivable in said grommet; said clamping means and said grommet having cable-receiving passageways; said clamping means having opposed, axially extending webs parallel to said passageways; first flexible cable-engaging band segments extending at first ends from said webs circumferentially about said passageways in a plane substantially transverse to said passageways; bridge means joined to second ends of said first flexible band segments and extending substantially parallel to said opposed webs; second flexible cable-engaging band segments extending substantially circumferentially from said bridge means; anchor means attached to the end of each of said second flexible band segments; recess means in said grommet for receiving said anchor means in interfitting engagement; said clamping means having a rotatable drive portion connected to said axially extending webs for rotating said webs and bridge means relative to said grommet and flexible band anchor means whereby each flexible band portion is rotated at the point of connection to said webs and bridge means.

3. The cable strain relief of claim 1 or 2 in which said rotatable drive portion includes an exterior head having surfaces for facilitating engagement by a tool for applying rotating forces thereto.

4. The strain relief of claim 1 in which two clamping bands as described in claim 1 are diametrically opposed and anchored in said grommet, and said clamping means rotatable drive simultaneously rotates the movable end portion of each flexible band portion about said axes.

5. The strain relief of claim 4 in which each of said two opposed clamping bands is composed of two sections axially displaced relative to each other and located in parallel planes; said clamping means rotatable drive portion comprising an interconnecting web engaging the movable end portion of each flexible hand portion and extending between said two parallel planes.

6. The strain relief of claim 1 or 2 in which said grommet has an inner annular shoulder surrounding the cable-receiving passageway therein and said clamping means has a radially outwardly extending protuberance adapted for underlying said shoulder; said shoulder having a slot for passage of said protuberance.

7. The strain relief of claim 1 or 2 in which said grommet and said clamping means have mutually engaging annular surfaces, and cooperating locking means disposed on said annular surfaces for permitting rotary movement of said clamping means in one direction of rotation only when said annular surfaces are in mutual engagement.

8. The strain relief of claim 7 in which the end edge surface of said grommet has a plurality of annularly arranged locking teeth thereon and at least one anti-rotation tooth adapted to cooperate with said locking teeth in permitting relative rotation between said grommet and said clamping means in one direction only is resiliently mounted on an annular flange of said clamping means.

9. The strain relief of claim 8 in which a stop is disposed on said clamping means flange and is rotatable with said clamping means, and a stationary stop for engaging the clamping means top is disposed on said grommet edge surface for terminating the rotary movement of said clamping means relative to said grommet; said stops being located at radial distances shorter than those of said locking teeth.

* * * * *